United States Patent
Binek et al.

(10) Patent No.: US 11,179,895 B2
(45) Date of Patent: Nov. 23, 2021

(54) KINETIC DISASSEMBLY OF SUPPORT STRUCTURE SYSTEM FOR ADDITIVELY MANUFACTURED ROTATING COMPONENTS

(71) Applicant: UNITED TECHNOLOGIES CORPORATION, Farmington, CT (US)

(72) Inventors: Lawrence Binek, Glastonbury, CT (US); Matthew B. Kennedy, Vernon, CT (US); Evan Butcher, Manchester, CT (US); Jesse R. Boyer, Middletown, CT (US); Vijay Narayan Jagdale, South Windsor, CT (US); Dmytro Mykolayovych Voytovych, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 307 days.

(21) Appl. No.: 16/153,259

(22) Filed: Oct. 5, 2018

(65) Prior Publication Data

US 2020/0108562 A1 Apr. 9, 2020

(51) Int. Cl.
*B29C 64/40* (2017.01)
*B29C 64/153* (2017.01)
(Continued)

(52) U.S. Cl.
CPC ............ *B29C 64/40* (2017.08); *B29C 64/153* (2017.08); *F01D 5/02* (2013.01); *F01D 21/045* (2013.01);
(Continued)

(58) Field of Classification Search
CPC ... F01D 5/02; F01D 5/043; F01D 5/06; F01D 5/048; F01D 5/30; F01D 5/34; F01D 21/045; F05D 2230/233; F05D 2230/22; F05D 2230/53; F05D 2230/30; F05D 2230/31; F05D 2220/36; F04D 29/284; F04D 29/286; F04D 29/30; F04D 29/32;
(Continued)

(56) References Cited

U.S. PATENT DOCUMENTS

| 4,313,712 A * | 2/1982 | Briggs ................... F01D 25/16 |
| | | 416/2 |
| 9,566,939 B1 * | 2/2017 | Rivera ................... B60R 21/38 |

(Continued)

FOREIGN PATENT DOCUMENTS

| DE | 102016005710 | 1/2018 |
| WO | 2016127225 | 8/2016 |

OTHER PUBLICATIONS

European Patent Office, European Search Report dated May 29, 2020 in Application No. 19201331.6.

*Primary Examiner* — Christopher Verdier
(74) *Attorney, Agent, or Firm* — Snell & Wilmer L.L.P.

(57) ABSTRACT

A rotary component may comprise a first structure configured to rotate about an axis and a second structure configured to rotate about the axis. A support structure may be coupled to the first structure at a first attachment location and to the second structure at a second attachment location. The support structure may be configured to separate from the first structure and the second structure in response to a centrifugal force generated by the first structure and the second structure rotating about the axis.

13 Claims, 8 Drawing Sheets

(51) Int. Cl.
*F01D 5/02* (2006.01)
*F01D 21/04* (2006.01)
*B33Y 30/00* (2015.01)
*B33Y 80/00* (2015.01)
*B33Y 10/00* (2015.01)

(52) U.S. Cl.
CPC .............. *B33Y 10/00* (2014.12); *B33Y 30/00* (2014.12); *B33Y 80/00* (2014.12); *F05D 2230/22* (2013.01); *F05D 2230/233* (2013.01)

(58) Field of Classification Search
CPC .... F04D 29/321; F04D 29/322; F04D 29/325; F04D 29/329; F04D 29/34; B29C 64/40
USPC .................................................. 415/9; 416/2
See application file for complete search history.

(56) References Cited

U.S. PATENT DOCUMENTS

| | | | |
|---|---|---|---|
| 2014/0140845 A1* | 5/2014 | Hennes | ............... B21D 53/78 416/2 |
| 2015/0093283 A1 | 4/2015 | Miller et al. | |
| 2016/0311163 A1 | 10/2016 | Yasukochi | |
| 2017/0361534 A1 | 12/2017 | Fernandez-Nieves et al. | |
| 2018/0086004 A1 | 3/2018 | Van Espen | |

\* cited by examiner

KINETIC DISASSEMBLY OF SUPPORT STRUCTURE SYSTEM FOR ADDITIVELY MANUFACTURED ROTATING COMPONENTS

FIELD

The present disclosure relates to additive manufacturing, and, more specifically, to kinetic disassembly of support structures for additively manufactured rotating components.

BACKGROUND

A gas turbine engine includes a fan section, a compressor section, a combustor section, and a turbine section. The fan section may drive air along a bypass flowpath while the compressor section may drive air along a core flowpath. In general, during operation, air is pressurized in the compressor section and then mixed with fuel and ignited in the combustor section to generate combustion gases. The combustion gases flow through the turbine section, which extracts energy from the combustion gases to power the compressor section and generate thrust.

Additive manufacturing may be employed to form various components of a gas turbine engine. Forming components having complex geometries and overhanging portions may require the use of additively manufactured support structures. Typically, the support structures are machined away (i.e., removed) in post-processing. Machining the support structures can add considerable cost and time to the manufacturing process. Additionally, some geometries may not allow the removal tooling to properly access the support structures.

SUMMARY

Disclosed herein is a rotary component. In accordance with various embodiments, the rotary component may comprise a first structure configured to rotate about an axis, and a second structure configured to rotate about the axis. A first support structure may be coupled to the first structure at a first attachment location and to the second structure at a second attachment location. The first support structure may be configured to separate from the first structure and from the second structure in response to a centrifugal force generated by the first structure and the second structure rotating about the axis.

In various embodiments, the first support structure may comprise a first end portion located proximate the first attachment location, a second end portion located proximate the second attachment location, and a central portion extending radially between the first end portion and the second end portion.

In various embodiments, a width of the first end portion may be less than a width of the central portion. In various embodiments, a tensile strength in the first end portion of the first support structure may be less than a tensile strength in the central portion of the first support structure. In various embodiments, a density in the first end portion of the first support structure is less than a density in the central portion of the first support structure.

In various embodiments, a density in the central portion of the first support structure may be less than a density in the first end portion and a density in the second end portion.

In various embodiments, a plurality of support structures, including the first support structure, may be located circumferentially about the first structure. In various embodiments, the first structure may comprise a shaft, and the second structure may comprise a hub coupled to the shaft and configured to support a rotating blade. In various embodiments, the first structure may comprise a hub, and the second structure may comprise an airfoil extending radially outward from the hub.

Also disclosed herein is a turbine section of a gas turbine engine. In accordance with various embodiments, the turbine section may comprise a shaft configured to rotate about a central longitudinal axis of the gas turbine engine, and a hub radially outward from the shaft and configured to rotate about the central longitudinal axis. A first support structure may be coupled to the shaft and to the hub. The first support structure may be configured to separate from the shaft and from the hub in response to a centrifugal force generated by rotation of the hub about the central longitudinal axis.

In various embodiments, the first support structure may comprise a first end portion located proximate a first attachment location, a second end portion located proximate a second attachment location, and a central portion extending between the first end portion and the second end portion. The first support structure may be coupled to the shaft at the first attachment location, and to the hub at the second attachment location.

In various embodiments, at least one of the first end portion or the second end portion comprises a sloped surface. In various embodiments, wherein a density of the first support structure in at least one of the first end portion or the second end portion is different from a density of the first support structure in the central portion.

In various embodiments, a tensile strength of the first support structure in at least one of the first end portion or the second end portion is different from a tensile of the first support structure in the central portion.

In various embodiments, an airfoil may extend radially outward from the hub, and a second support structure may be coupled to the hub and to the airfoil. The second support structure may be configured to separate from the hub and from the airfoil in response to a centrifugal force generated by rotation of the airfoil about the central longitudinal axis.

Also disclosed herein is a method of making a rotary component. The method may comprise forming a first structure using additive manufacturing, forming a support structure extending from the first structure using additive manufacturing, forming a second structure over the support structure using additive manufacturing, and removing the support structure by rotating the first structure and the second structure about an axis.

In various embodiments, forming the support structure may comprise forming a first end portion of the support structure comprising a first tensile strength, and forming a central portion of the support structure comprising a second tensile strength different from the first tensile strength of the first end portion.

In various embodiments, removing the support structure by rotating the first structure and the second structure may comprise configuring a central portion of the support structure to fracture in response to a first centrifugal force, and configuring a first end of the support structure to separate from the first structure and a second end of the support structure to separate from the second structure in response to a second centrifugal force different from the first centrifugal force.

In various embodiments, at least one of a first end portion of the support structure or a second end portion of the support structure may comprise a sloped surface. The first end portion may be located proximate the first structure and the second end portion may be located proximate the second structure. In various embodiments, the first structure may comprise a shaft, and the second structure may comprise a hub configured to support a rotating blade.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
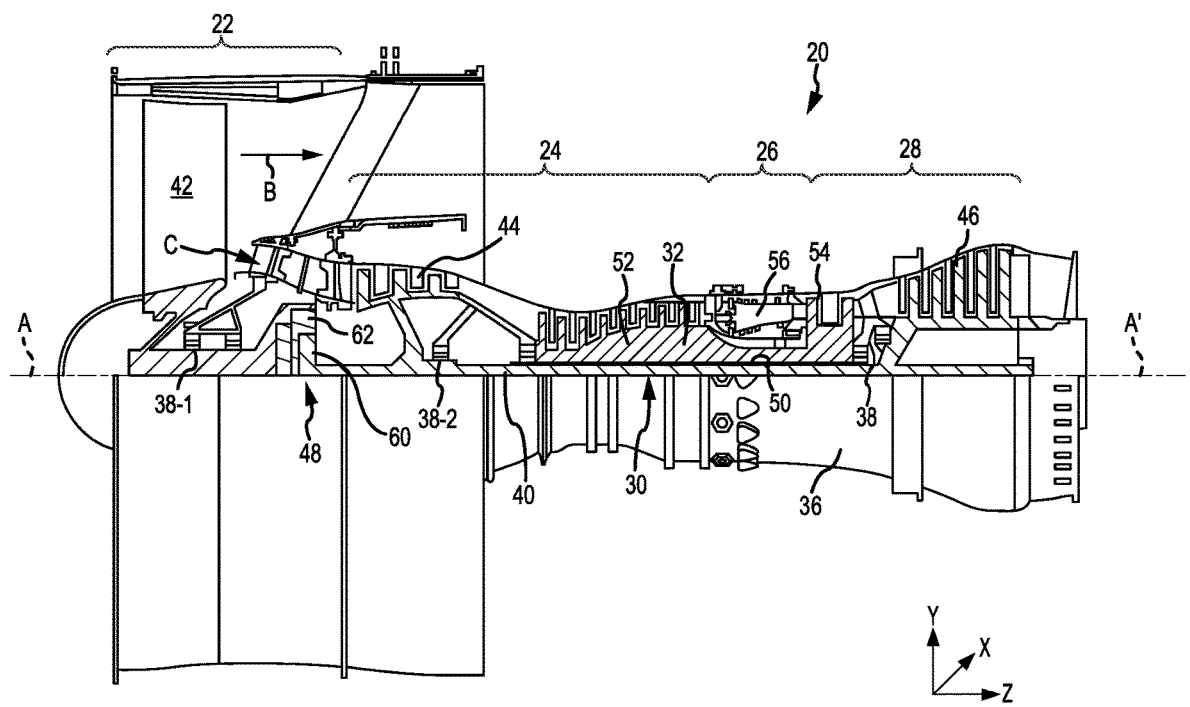
FIG. 1 illustrates a cross-sectional view of an exemplary gas turbine engine, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "proximate" refers to a direction towards, or generally closer to, a reference component. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

As used herein, the term "additive manufacturing" encompasses any method or process whereby a three-dimensional object is produced by creation of a substrate or material, such as by addition of successive layers of a material to an object to produce a manufactured product that has an increased mass or bulk at the end of the additive manufacturing process as compared to the beginning of the process. In contrast, traditional (i.e., non-additive) manufacturing by machining or tooling typically relies on material removal or subtractive processes, such as cutting, machining, extruding, lathing, drilling, grinding, stamping, and/or the like, to produce a final manufactured object that has a decreased mass or bulk relative to the starting workpiece. Other traditional, non-additive manufacturing methods include forging or casting, such as investment casting, which utilizes the steps of creating a form, making a mold of the form, and casting or forging a material (such as metal) using the mold. As used herein, the term "additive manufacturing" should not be construed to encompass a joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

With reference to FIG. 1, a gas turbine engine 20 is provided, in accordance with various embodiments. Gas turbine engine 20 may be a two-spool turbofan that generally incorporates a fan section 22, a compressor section 24, a combustor section 26, and a turbine section 28. In operation, fan section 22 drives fluid (e.g., air) along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

Gas turbine engine 20 generally comprises a low speed spool 30 and a high speed spool 32 mounted for rotation about an engine central longitudinal axis A-A' relative to an engine static structure 36 via several bearing systems 38, 38-1, and 38-2. Engine central longitudinal axis A-A' is oriented in the z direction (i.e., axial direction) on the provided xyz axes. The y direction on the provided xyz axes refers to the radial direction and the x direction on the provided xyz axes refers to the circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded through the high pressure turbine 54 and low pressure turbine 46. Turbines 46, 54 rotationally drive the respective low speed spool 30 and high speed spool 32 in response to the expansion.

In various embodiments, one or more rotating components of gas turbine engine 20 may be formed using additive manufacturing. For example, fan section 22, compressor section 24, and turbine section 28 each comprise one or more stages or sets of rotating blade assemblies configured to rotate about engine central longitudinal axis A-A'. In various embodiments, the blade assemblies in fan section 22, compressor section 24, and/or turbine section 28 may be formed using additive manufacturing, for example, using laser-based powder bed fusion.

Figure 2A:
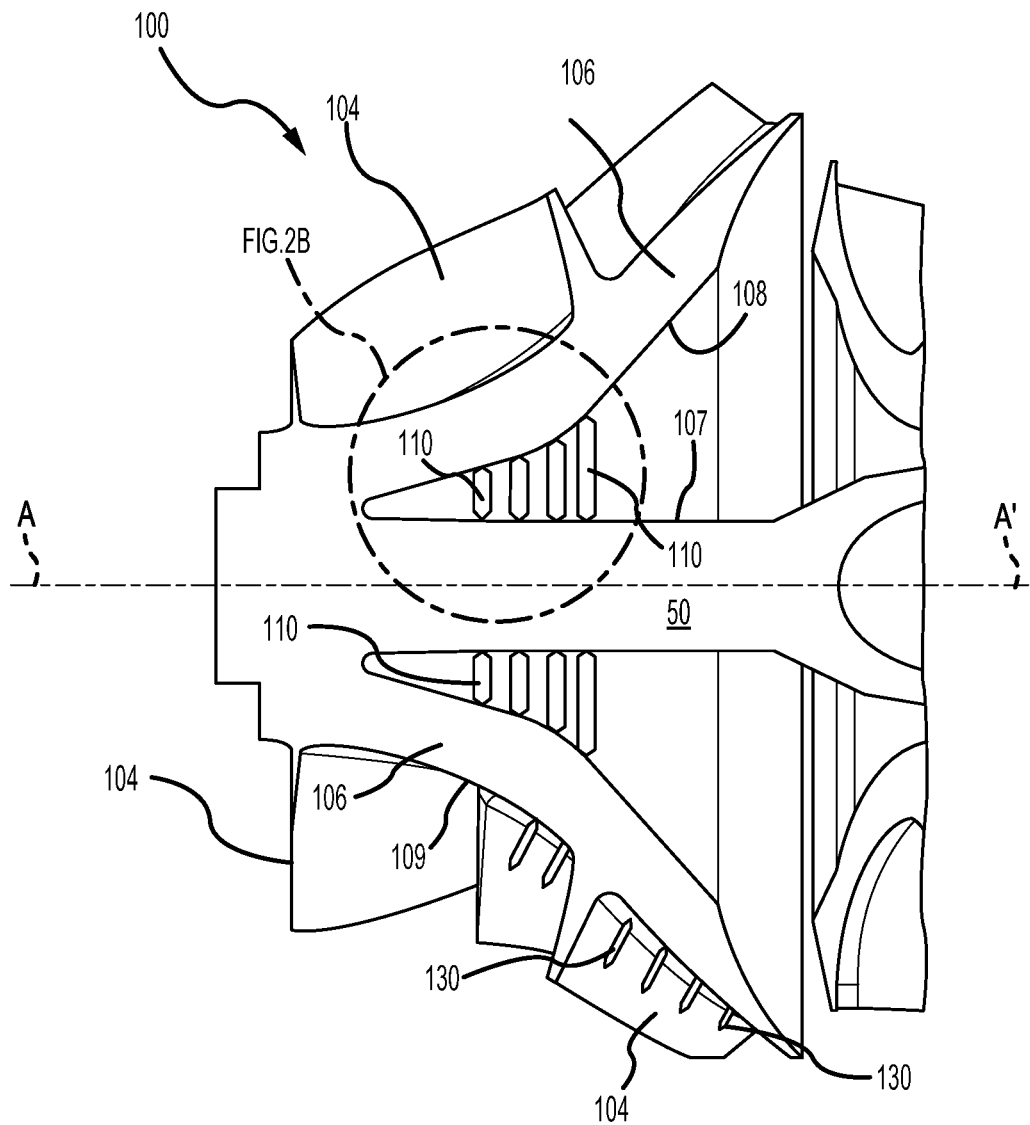
FIGS. 2A, 2B, and 2C illustrate a high pressure turbine having additively manufactured support structures configured for kinetic disassembly, in accordance with various embodiments.

Referring now to FIG. 2, and with continued reference to FIG. 1, a cross-section of a blade assembly 100 of high pressure turbine 54 is illustrated. In accordance with various embodiments, blade assembly 100 may include airfoils 104. Airfoils 104 are coupled to, and extend radially outward from, a hub 106. Hub 106 is located radially outward of, and may be coupled to, outer shaft 50. Airfoils 104, hub 106, and outer shaft 50 are configured to rotate about a common axis (e.g., engine central longitudinal axis A-A'). In this regard, airfoils 104, hub 106, and outer shaft 50 form a rotary component (e.g., a blade assembly) of gas turbine engine 20.

Airfoils 104, hub 106, and outer shaft 50 may be formed using additive manufacturing, for example, using laser-based powder bed fusion. In accordance various embodiments, one or more support structures 110 may be formed, using additive manufacturing, between a radially outward surface 107 of outer shaft 50 and a radially inward surface 108 of hub 106. Hub 106 and support structures 110 may be formed from an additively manufactured metal or metal alloy. For example, hub 106 and support structures 110 may comprise an additively manufacture nickel-base super alloy, titanium alloy, or any other metal or metal alloy that may be additively manufactured. Support structures 110 may be formed to support formation of hub 106 at various angles relative to outer shaft 50. Stated differently, to form hub 106 having the desired geometry and/or at the desired angle relative to outer shaft 50 one or more support structures 110 may be formed radially inward of hub 106 to support the deposition of the material (e.g., metal or metal alloy) of hub 106.

In various embodiments, one or more support structures 130, similar to support structures 110, may be formed, using additive manufacturing, between airfoils 104 and a radially outward surface 109 of hub 106. Airfoils 104 and support structures 130 may be formed from an additively manufactured metal or metal alloy. For example, airfoils 104 and support structures 130 may comprise an additively manufactured nickel-base super alloy, titanium alloy, or any other metal or metal alloy that may be additively manufactured. Support structures 130 may be formed to support formation of airfoils 104 at various angles relative to hub 106. Stated differently, to form airfoils 104 having the desired geometry and/or at the desired angle relative to hub 106 and/or one or more support structures 130 may be formed radially inward of airfoils 104 to support the deposition of the material (e.g., metal or metal alloy) of airfoils 104.

Figure 2B:
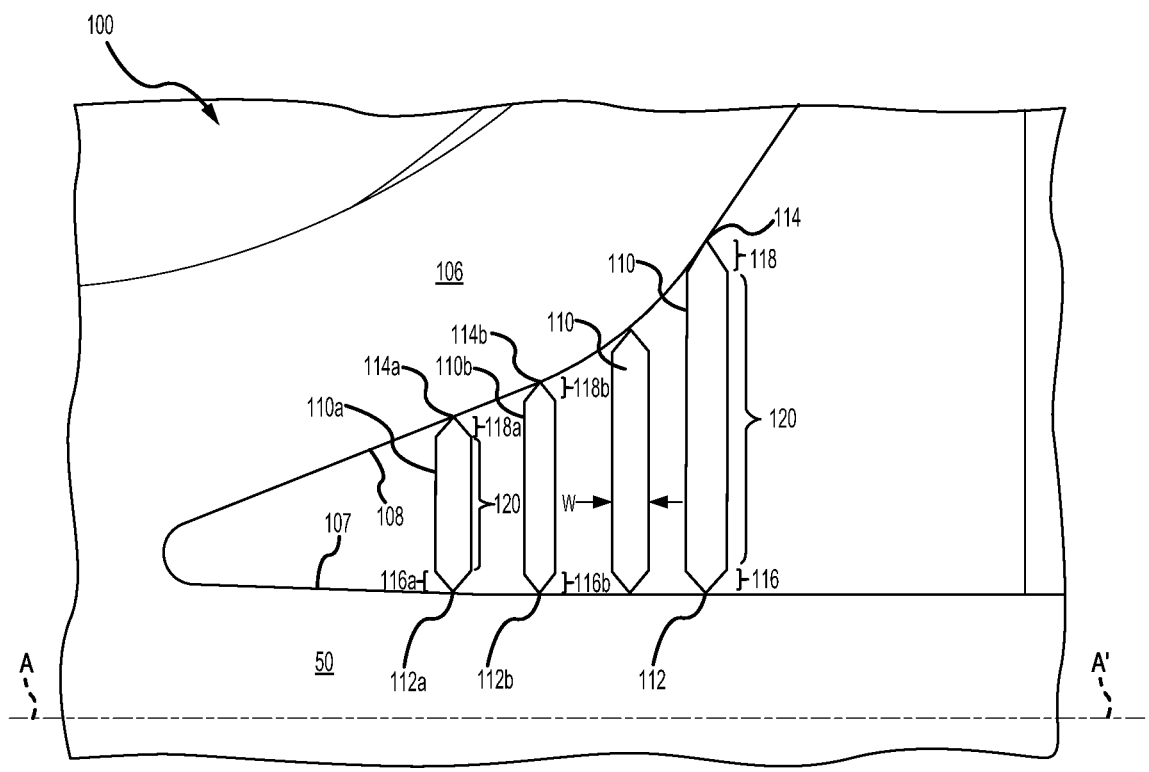

Referring now to FIG. 2B, additional details of support structures 110 are illustrated, in accordance with various embodiments. Support structures 110 may each be attached to outer shaft 50 at an attachment location 112 and to hub 106 at an attachment location 114. Support structures 110 are located circumferentially around outer shaft 50, and extend radially between outer shaft 50 and hub 106. As discussed in further detail below, support structures 110 are configured to separate, or break apart, from outer shaft 50 and hub 106 at attachment locations 112, 114, respectively, in response to centrifugal force generated by rotation of blade assembly 100 (i.e., hub 106 and outer shaft 50) about engine central longitudinal axis A-A'. For example, a density, tensile strength, and/or microstructure of support structures 110 may be different from the density, tensile strength, and/or microstructure of outer shaft 50 and hub 106. Stated differently, the interfaces between support structures 110 and outer shaft 50 and between support structures 110 and hub 106 are designed (e.g., a width, tensile strength, density, etc. of support structures 110 are selected) such that, during operation of gas turbine engine 20, the centrifugal force generated at attachment locations 112, 114 will apply a stress to support structures 110 that exceeds an ultimate allowable stretch for support structures 110, and will thereby cause support structures 110 to separate from outer shaft 50 and hub 106 at attachment locations 112, 114, respectively. Support structures 130, with momentary reference to FIG. 2A, may be configured to separate from airfoils 104 and hub 106 in a similar manner (i.e., in response to centrifugal force).

Returning to FIG. 2B, support structures 110 each comprise a radially inward (or first) end portion 116 (also referred to as a first terminal end portion) located proximate attachment location 112, a radially outward (or second) end portion 118 (also referred to as a second terminal end portion) located proximate attachment location 114, and a central portion 120 extending between first end portion 116 and second end portion 118. In various embodiments, first end portion 116 and second end portion 118 each comprises at least one or more sloped surface(s), with an apex of first end portion 116 located at attachment location 112, and an apex of second end portion 118 located at attachment location 114. Stated differently, a width W of central portion 120 of support structures 110 may be greater than the widths of first and second end portions 116,118 as measured proximate to attachment locations 112, 114, respectively. A ratio of the width in central portion 120 to the width of first and second end portions 116,118 at attachment locations 112, 114 may be configured such that support structures 110 will shear at attachment locations 112, 114 (i.e., proximate radially outward surface 107 of outer shaft 150 and radially inward surface 108 of hub 106). In various embodiments, a ratio of the width of support structure 110 in central portion 120 to the width of support structure 110 at attachment location 112 may be between 2:1 and 15:1. In various embodiments, the ratio of the width of central portion 120 to the width of support structure 110 at attachment location 112 may be between 3:1 and 10:1. In various embodiments, the ratio of the width of central portion 120 to the width of support structure 110 at attachment location 112 may be between 4:1 and 7:1.

In various embodiments, support structures 110 may be formed such that a tensile strength in first end portion 116, and particularly the tensile strength at attachment location 112, is less than the tensile strength in central portion 120. In various embodiments, support structures 110 may be formed such that a tensile strength in second end portion 118, and particularly the tensile strength at attachment location 114, is less than the tensile strength in central portion 120. The difference in tensile strength in central portion 120, as compared to the tensile strength in first and second end portions 116,118 at attachment locations 112, 114, is configured such that support structures 110 will shear at attachment locations 112, 114 (i.e., proximate radially outward surface 107 of outer shaft 150 and radially inward surface 108 of hub 106).

In various embodiments, support structures 110 may be formed such that a density of support structure 110 in first end portion 116, and particularly the density at attachment location 112, is less than the density of support structure 110 in central portion 120. In various embodiments, a density of support structure 110 in second end portion 118, and particularly the density at attachment location 114, may be less than the density in central portion 120. In various embodiments, a ratio of the density of support structure 110 in central portion 120 to the density of support structure 110 at attachment location 112 may be between 2:1 and 15:1. In various embodiments, the ratio of the density of central portion 120 to the density of support structure 110 at attachment location 112 may be between 3:1 and 10:1. In various embodiments, the ratio of the density of central portion 120 to the density of support structure 110 at attachment location 112 may be between 4:1 and 7:1. The decreased density in first and second end portions 116,118, as compared to central portion 120 is configured to cause support structures 110 to shear at attachment locations 112, 114 (i.e., proximate radially outward surface 107 of outer shaft 150 and radially inward surface 108 of hub 106).

Support structures 110 are each configured (e.g., the width, tensile strength, density, etc. of first and second end portions 116, 118) such that, during operation of gas turbine engine 20, the centrifugal force generated at attachment locations 112, 114 will apply a stress to support structures 110 that exceeds an ultimate allowable stretch for support structures 110, and will thereby cause support structures 110 to separate from outer shaft 50 and hub 106 at attachment locations 112, 114, respectively.

In various embodiments, the width, tensile strength, and/or density of each support structure 110 may be selected based on the centrifugal force generated at the particular location of each support structure 110. For example, the centrifugal force generated at attachment locations 112a, 114a of a first support structure 110a may be different from the centrifugal force generated at attachment locations 112b, 114b of a second support structure 110b. In this regard, a width, tensile strength, and/or density of first and second end portions 116a, 118a are selected such that the centrifugal force generated at attachment locations 112a, 114a will apply a stress to first support structure 110a that exceeds an ultimate allowable stretch for first support structure 110a; while, a width, tensile strength, and/or density of first and second end portions 116b, 118b are selected such that the centrifugal force generated at attachment locations 112b, 114b will apply a stress to second support structure 110b that exceeds an ultimate allowable stretch for second support structure 110b. In various embodiments, the width, density and/or tensile strength in first and second end portions 116, 118 of support structures 110 may vary in a circumferential direction, an axial direction, and/or a radial direction.

In various embodiments, a location of support structures 110 may be selected based on the centrifugal force generated during rotation of blade assembly 100. In various embodiments, support structure 110 may be located in areas that will apply at least 100,000 pounds per square inch (psi) (689.5 megapascal (MPa)) of force to support structures 110. In various embodiments, support structure 110 may be located in areas that will apply at least 130,000 psi (896.3 MPa) of force to support structures 110. In various embodiments, support structures 110 may be located where rotation of hub 106 generates the greatest stress, or centrifugal force, at a particular rotation speed.

Figure 2C:
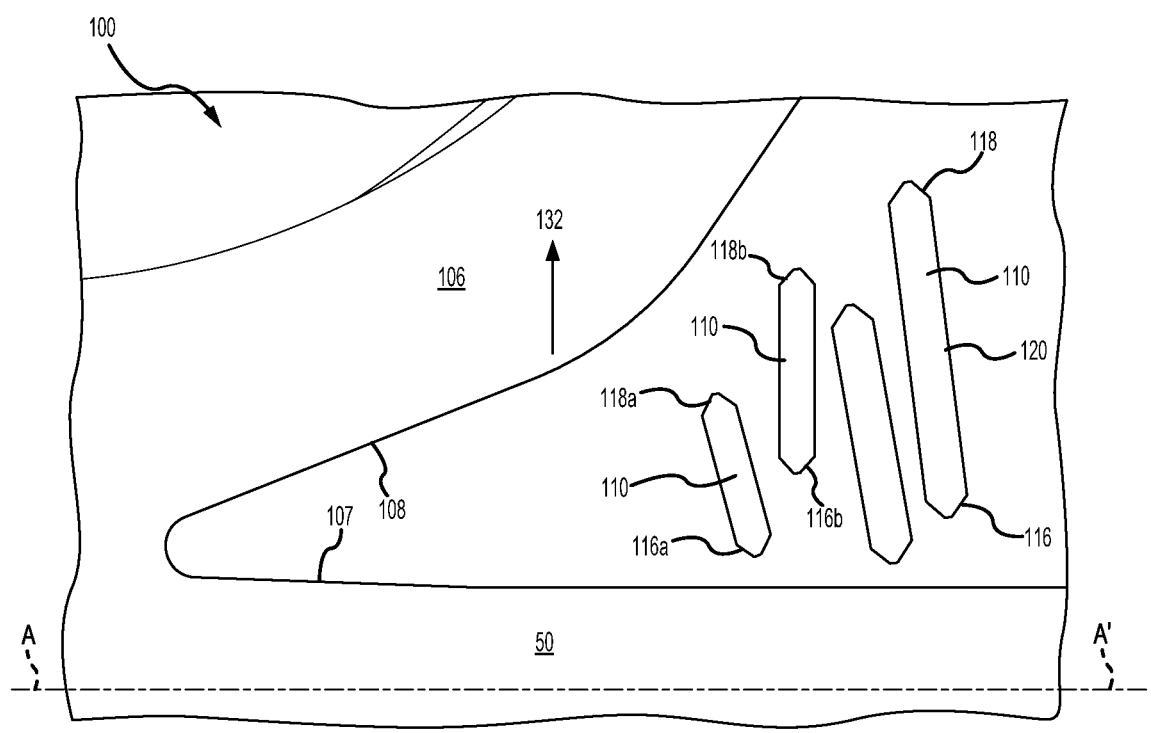

FIG. 2C shows blade assembly 100 with support structures 110 separated from hub 106 and outer shaft 50, in accordance with various embodiments. During operation of gas turbine engine 20, outer shaft 50 and hub 106 rotate about engine central longitudinal axis A-A'. The rotation of outer shaft 50 and hub 106 generates a centrifugal force, which tends to cause hub 106 to translate away from outer shaft 50, or generally in the direction of arrow 132. The centrifugal force and translation of hub 106 generates a stress within support structures 110. The width, tensile strength, and/or density of each support structure 110 is selected such that the stress generated by the centrifugal force will exceed an ultimate allowable stretch of support structures 110. The stress exceeding the ultimate allowable stretch causes support structures 110 to separate from outer shaft 50 and hub 106. Liberated support structures 110 may then travel downstream and be expelled from gas turbine engine 20.

In various embodiments, small particulates of support structures 110 may remain attached to hub 106 and/or to outer shaft 50. Accordingly, a balancing operation may be performed to balance blade assembly 100 and account for any portions of support structures 110 still attached to hub 106 and/or to outer shaft 50.

Kinetically removing support structures 110 using rotation of gas turbine engine 20 components may reduce manufacturing time and costs and may also allow for more complex rotary component geometries, as compared to machining or other techniques for removing additively manufactured support structures.

Figure 3A:
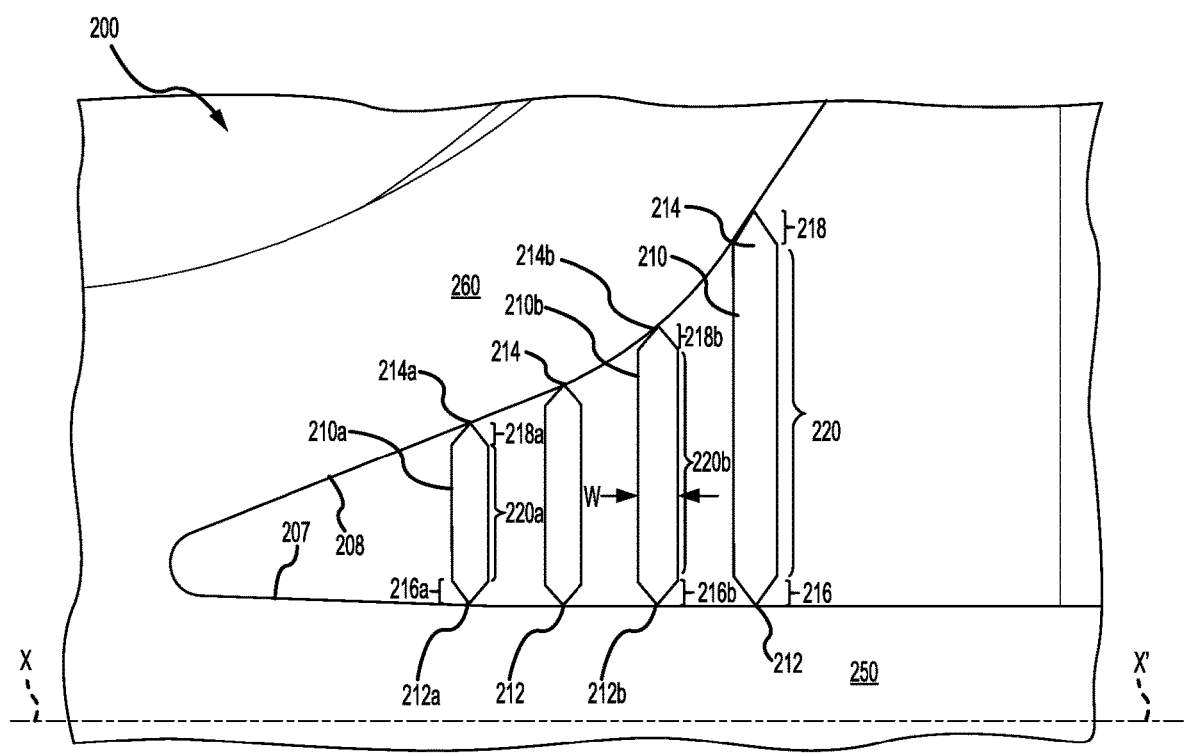
FIGS. 3A, 3B, and 3C illustrate a rotary component having additively manufactured support structures configured for fracture and removal by kinetic disassembly, in accordance with various embodiments.

With reference to FIG. 3A, an additively manufactured rotatory component 200 having support structures configured for fracture and kinetic removal is illustrated, in accordance with various embodiments. In various embodiments, rotary component 200 may form a portion of a gas turbine engine. For example, and with momentary reference to FIG. 1, rotary component 200 may form a portion of fan section 22, compressor section 24, or turbine section 28 of gas turbine engine 20. Rotary component 200 includes a first structure 250 and a second structure 260. Second structure is located radially outward of first structure 250. First and second structures 250, 260 are configured to rotate about a common axis X-X'. In various embodiments, first structure 250 may comprise a shaft of a gas turbine engine, similar to outer shaft 50 in FIG. 1, and second structure 260 may comprise a hub configured to support rotating airfoils of a gas turbine engine, similar to hub 106 in FIG. 2A.

First and second structures 250, 260 may be formed using additive manufacturing, for example, using laser-based powder bed fusion. In accordance various embodiments, one or more support structures 210 may be formed, using additive manufacturing, between first structure 250 and second structure 260. First and second structures 250, 260 and support structures 210 may be formed from an additively manufactured metal or metal alloy, for example, an additively manufacture nickel-base super alloy, titanium alloy, or any other metal or metal alloy that may be additively manufactured. Support structures 210 may be formed to support formation of second structure 260 at various angles relative to first structure 250. Stated differently, to form second structure 260 having the desired geometry and/or at the desired angle relative to first structure 250, one or more support structure 210 may be formed radially inward of second structure 260 to support the deposition of the material (e.g., metal or metal alloy) of second structure 260.

Support structures 210 may each be attached to first structure 250 at an attachment location 212 and to second structure 260 at an attachment location 214. The attachment interfaces between support structures 210 and first and second structures 250, 260 are designed (e.g., a width, tensile strength, density, etc. of support structure 210 is selected) such that rotation of rotary component 200 generates a centrifugal force and applies stress to support structures 210 that exceeds an ultimate allowable stretch for support structures 210, and thereby causes support structures 210 to separate from first and second structures 250, 260. As discussed in further detail below, support structures 210 may be configured to fracture in a central portion of the support structure prior to the support structure separating, or breaking apart, from first and second structures 250, 260.

Support structures 210 each comprise a radially inward (or first) end portion 216 located proximate attachment location 212, a radially outward (or second) end portion 218 located proximate attachment location 214, and a central portion 220 extending between first end portion 216 and second end portion 218.

In various embodiments, support structures 210 may be formed such that a tensile strength in central portion 220 is less than a tensile strength in first end portion 216 and less than a tensile strength in second end portion 218. In various embodiments, support structures 210 may be formed such that a density of support structure 210 in central portion 220 is less than a density in first end portion 216 and less than a density in second end portion 218.

In various embodiments, the width, density, and/or tensile strength in first and second end portions 216, 218 and in central portion 220 of support structures 210 may vary in a circumferential direction, an axial direction, and/or a radial direction. In various embodiments, the width, tensile strength, and/or density of each support structure 210 may be selected based on the centrifugal forces generated at each particular support structure 210 location. For example, the centrifugal forces generated at the attachment locations 212a, 214a of a first support structure 210a may be different from the centrifugal forces generated at the attachment locations 212b, 214b of a second support structure 210b. In this regard, a width, tensile strength, and/or density of first and second end portions 216a, 218a and a tensile strength and/or density of central portion 220a are selected based on the centrifugal force generated at attachment locations 212a, 214a; while, a width, tensile strength, and/or density of first and second end portions 216b, 218b and a tensile strength and/or density of central portion 220b are selected based on the centrifugal force generated at attachment locations 212b, 214b.

Figure 3B:
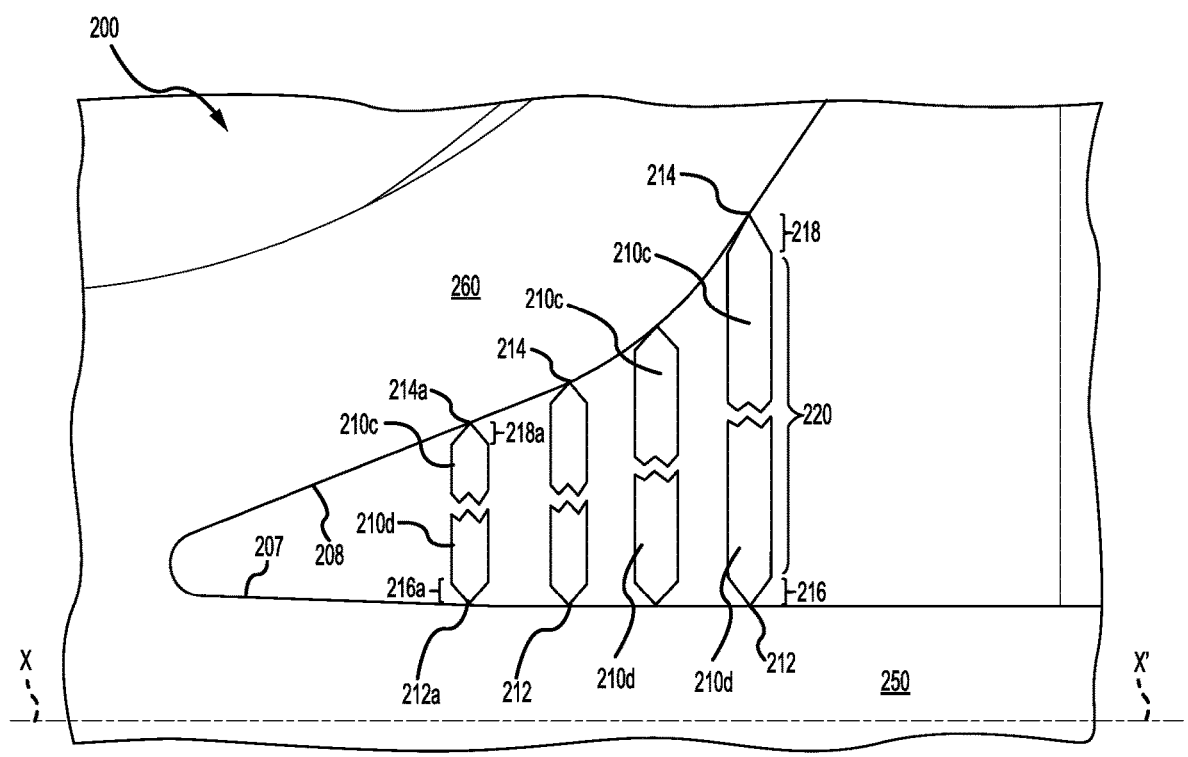

FIG. 3B shows rotary component 200 with support structures 210 fractured in central portion 220. In accordance with various embodiments, during rotation of rotary component 200, first structure 250 and second structure 260 rotate about common axis X-X'. The rotation of generates a centrifugal force, which tends to cause second structure 260 to translate away from first structure 250. The centrifugal force and translation of second structure 260 generates a stress within support structures 210. The tensile strength and/or density of support structures 210 is/are selected such that the stress generated by the centrifugal force will exceed an ultimate allowable stretch of central portion 220. The stress exceeding an ultimate allowable stretch within central portion 220 causes support structures 210 to separate and/or fracture into first and second support structure portions 210c, 210d.

In accordance with various embodiments, the tensile strength and/or density of central portions 220 and the width, tensile strength, and/or density of first and second end portions 216, 218 may each be selected to cause support structures 210 to fracture in central portion 220 prior to separation of first and second end portions 216, 218 from first and second structures 250, 260, respectively. For example, the tensile strength and/or density of central portion 220 is/are selected such that a first centrifugal force generated at a first rotation speed (e.g., rotation per minute (RPM)) will apply a stress to support structures 210 that exceeds an ultimate allowable stretch for central portions 220, but is less than the an ultimate allowable stretch at attachment locations 212, 214, and the width, tensile strength, and/or density of first and second end portions 216, 218 are selected such that a second centrifugal force generated at a second rotation speed, which may be greater than the first rotation speed, will apply a stress to first and second support structure portions 210c, 210d that exceeds an ultimate allowable stretch in first and second end portions 216, 218, and thereby causes first and second support structure portions 210c, 210d to separate from first and second structures 250, 260 at attachment locations 212, 214, respectively.

In various embodiments, the width, density, and/or tensile strength in first and second end portions 216, 218 may vary in a circumferential direction, an axial direction, and/or a radial direction.

Figure 3C:
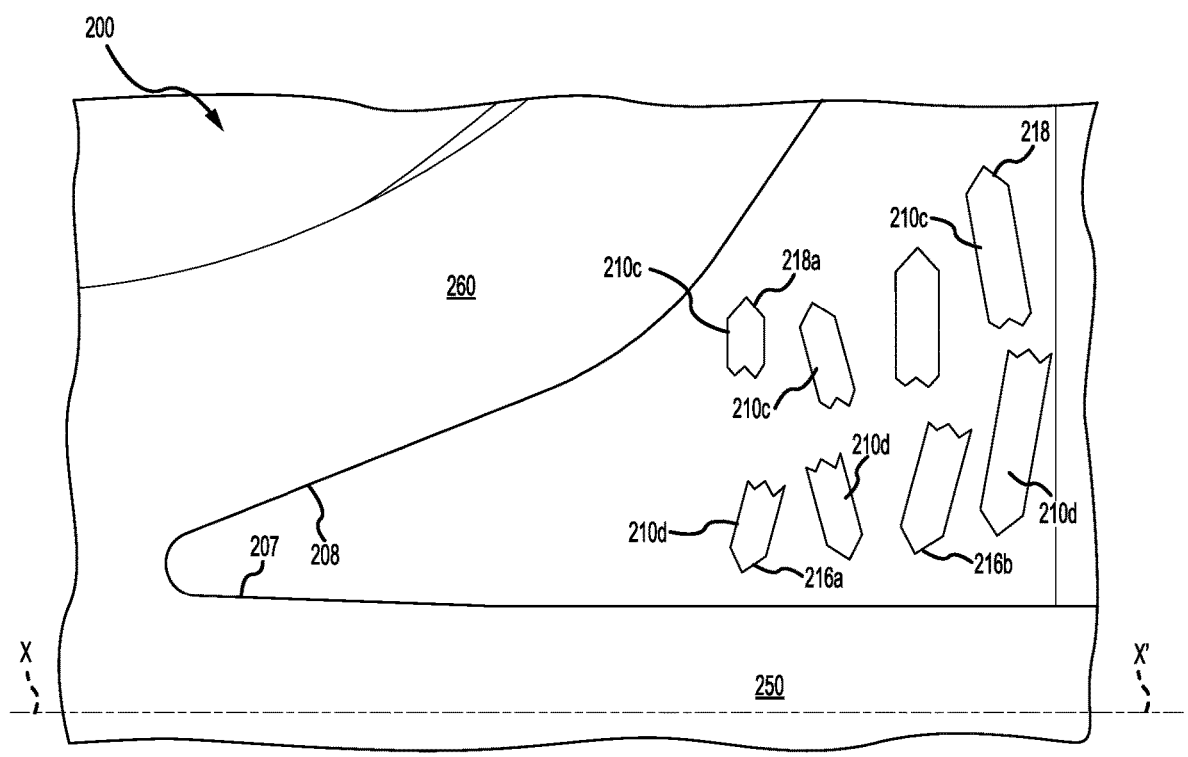

FIG. 3C shows rotary component 200 with first and second support structure portions 210c, 210d separated from first and second structures 250, 260. In accordance with various embodiments, as the rotation speed (e.g., RPM) of second structure 260 is increased, the centrifugal force increases. The increased centrifugal force generates a stress within first and second support structure portions 210c, 210d at attachment locations 212, 214. The width, tensile strength, and/or density of first and second end portions 216, 218 are selected such that the stress generated by the increased centrifugal force will exceed an ultimate allowable stretch of first and second end portions 216, 218. The stress exceeding an ultimate allowable stretch causes the first and second support structure portions 210c, 210d to separate from first structure 250 and second structure 260, respectively. Liberated first and second support structure portions 210c, 210d may then travel downstream and be expelled from rotary component 200.

Kinetically removing support structures 210 using centrifugal force may reduce manufacturing time and costs for rotary component 200, and may allow for more complex rotary component geometries, as compared to machining or other techniques for removing additive manufactured support structures.

Figure 4:
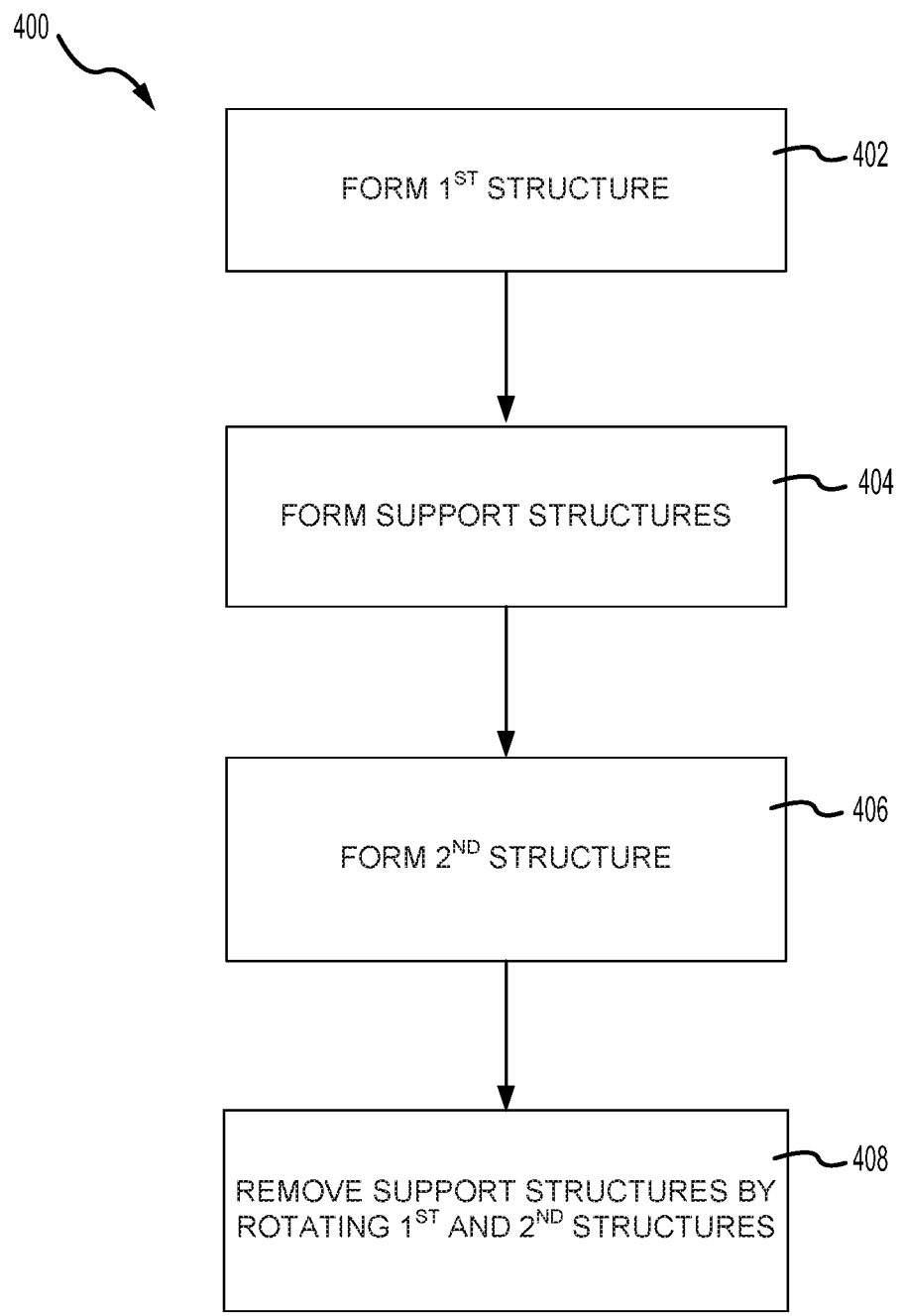
FIG. 4 illustrates a method of making a rotary component, in accordance with various embodiments.

Referring now to FIG. 4 a method 400 of making a rotary component is illustrated, in accordance with various embodiments. Method 400 may include forming a first structure using additive manufacturing (step 402), forming a plurality of support structures extending from the first structure (step 404), forming a second structure over the support structures using additive manufacturing (step 406), and removing the support structures by rotating the first structure and second structure about an axis (step 408).

In various embodiments, step 404 may include forming a first end portion of the support structures comprising a first tensile strength, and forming a central portion of the support structure comprising a second tensile strength different from the first tensile strength of the first end portion. In various embodiments, step 408 may include configuring a central portion of the support structure to fracture in response to a first centrifugal force, and configuring a first end of the support structure to separate from the first structure and a second end of the support structure to separate from the second structure in response to a second centrifugal force different from the first centrifugal force.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rotary component, comprising:
   a first structure configured to rotate about a first axis;
   a second structure configured to rotate about the first axis; and
   a first support structure formed radially between the first structure and the second structure, the first support structure comprising:
   a first terminal end portion connected to the first structure at a first attachment location;
   a second terminal end portion connected to the second structure at a second attachment location; and
   a central portion extending radially between the first terminal end portion and the second terminal end portion, wherein a second axis extending radially from the first terminal end portion to the second terminal end portion is generally perpendicular to the first axis, and
   wherein the first terminal end portion separates from the first structure and the second terminal end portion separates from the second structure in response to a centrifugal force generated by the first structure and the second structure rotating about the first axis.

2. The rotary component of claim 1, wherein a width of the first terminal end portion is less than a width of the central portion, and wherein a width of the second terminal end portion is less than the width of the central portion.

3. The rotary component of claim 1, wherein a tensile strength in the first terminal end portion of the first support structure is less than a tensile strength in the central portion of the first support structure.

4. The rotary component of claim 1, wherein a density in the first terminal end portion of the first support structure is less than a density in the central portion of the first support structure.

5. The rotary component of claim 1, wherein a density in the central portion of the first support structure is less than a density in the first terminal end portion and less than a density in the second terminal end portion.

6. The rotary component of claim 1, further comprising a plurality of support structures located circumferentially about the first structure, the plurality of support structures including the first support structure.

7. The rotary component of claim 1, wherein the first structure comprises a shaft, and wherein the second structure comprises a hub coupled to the shaft and configured to support a rotating blade.

8. The rotary component of claim 1, wherein the first structure comprises a hub, and wherein the second structure comprises an airfoil extending radially outward from the hub.

9. A turbine section of a gas turbine engine, comprising:
a shaft configured to rotate about a central longitudinal axis of the gas turbine engine;
a hub radially outward from the shaft and configured to rotate about the central longitudinal axis; and
a first support structure extending in a radial direction and connected to the shaft and to the hub, the first support structure including:
  a first terminal end portion connected to the shaft at a first attachment location;
  a second terminal end portion connected to the hub at a second attachment location; and
  a central portion extending radially between the first terminal end portion and the second terminal end portion, wherein an axis extending radially from the first terminal end portion to the second terminal end portion is generally perpendicular to the central longitudinal axis, and wherein the first support structure separates from the shaft and from the hub in response to a centrifugal force generated by rotation of the hub about the central longitudinal axis, and wherein the radial direction is generally perpendicular to the central longitudinal axis of the gas turbine engine.

10. The turbine section of claim 9, wherein at least one of the first terminal end portion or the second terminal end portion comprises a sloped surface.

11. The turbine section of claim 9, wherein a density of the first support structure in at least one of the first terminal end portion or the second terminal end portion is different from a density of the first support structure in the central portion.

12. The turbine section of claim 9, wherein a tensile strength of the first support structure in at least one of the first terminal end portion or the second terminal end portion is different from a tensile strength of the first support structure in the central portion.

13. The turbine section of claim 9, further comprising:
an airfoil extending radially outward from the hub; and
a second support structure coupled to the hub and to the airfoil, wherein the second support structure is configured to separate from the hub and from the airfoil in response to a centrifugal force generated by rotation of the airfoil about the central longitudinal axis.

* * * * *